United States Patent
Sambhwani et al.

(10) Patent No.: US 7,088,825 B2
(45) Date of Patent: Aug. 8, 2006

(54) LOW I/O BANDWIDTH METHOD AND SYSTEM FOR IMPLEMENTING DETECTION AND IDENTIFICATION OF SCRAMBLING CODES

(75) Inventors: Sharad Sambhwani, San Diego, CA (US); Ghobad Heidari, San Diego, CA (US)

(73) Assignee: Quicksilver Technology, Inc., San Jose, CA (US)

(*) Notice: Subject to any disclaimer, the term of this patent is extended or adjusted under 35 U.S.C. 154(b) by 748 days.

(21) Appl. No.: 10/015,531

(22) Filed: Dec. 12, 2001

(65) Prior Publication Data

US 2003/0108203 A1    Jun. 12, 2003

(51) Int. Cl.
*H04N 7/167* (2006.01)
(52) U.S. Cl. ...................... 380/268; 380/276
(58) Field of Classification Search .............. 380/268, 380/276
See application file for complete search history.

(56) References Cited

U.S. PATENT DOCUMENTS 5,894,473 A * 4/1999 Dent ............... 370/342
5,991,308 A * 11/1999 Fuhrmann et al. ..... 370/395.53

* cited by examiner

*Primary Examiner*—Thomas R. Peeso
(74) *Attorney, Agent, or Firm*—Townsend and Townsend and Crew

(57) ABSTRACT

A system for detecting and identifying the identity of a base station or cell which transmits a scrambling code is provided. According to one aspect of the system, the system is used to perform scrambling code detection of eight (8) primary cells (each scrambling code being spaced sixteen (16) chips apart) in a group. According to another aspect of the system, a single scrambling code generator is used to generate a master scrambling code. The master scrambling code is then used to create individual scrambling codes which are used in correlation with received signals to detect in parallel which one of the eight (8) possible primary cells in the group transmitted the received signals. According to yet another aspect of the system, each of the correlators maintains a corresponding segment of the master scrambling code. For every sixteen (16) chips, a new segment of the master scrambling code is introduced into one of the correlators, a segment of the master scrambling code is dropped from another correlator, and segments of the master scrambling code are sequentially shifted or propagated through the remaining correlators; and concurrent correlations are performed by the correlators using their respective corresponding segments of the master scrambling code and newly received signals.

45 Claims, 6 Drawing Sheets

FIG. 7A

CORRELATION RESULTS BETWEEN
$D_0 \rightarrow D_{255}$ AND $C_0 \rightarrow C_{255}$
$C_{16} \rightarrow C_{271}$
$C_{32} \rightarrow C_{287}$
$\vdots$
$C_{112} \rightarrow C_{367}$

$D_0C_0 + D_1C_1 + D_2C_2 + \ldots + D_{255}C_{255}$
$D_0C_{16} + D_1C_{17} + D_2C_{18} + \ldots + D_{255}C_{271}$
$D_0C_{32} + D_1C_{33} + D_2C_{34} + \ldots + D_{255}C_{287}$
$\vdots$
$D_0C_{112} + D_1C_{113} + D_2C_{114} + \ldots + D_{255}C_{367}$

FIG. 7B

CORRELATION RESULTS BETWEEN
$D_0 \rightarrow D_{15}$ AND $C_0 \rightarrow C_{15}$
$C_{16} \rightarrow C_{31}$
$C_{32} \rightarrow C_{47}$
$\vdots$
$C_{112} \rightarrow C_{127}$

$D_0C_0 + D_1C_1 + D_2C_2 + \ldots + D_{15}C_{15}$
$D_0C_{16} + D_1C_{17} + D_2C_{18} + \ldots + D_{15}C_{31}$
$D_0C_{32} + D_1C_{33} + D_2C_{34} + \ldots + D_{15}C_{47}$
$\vdots$
$D_0C_{112} + D_1C_{113} + D_2C_{114} + \ldots + D_{15}C_{127}$

LOW I/O BANDWIDTH METHOD AND SYSTEM FOR IMPLEMENTING DETECTION AND IDENTIFICATION OF SCRAMBLING CODES

CROSS-REFERENCES TO RELATED APPLICATION(S)

The present application is related to U.S. patent application Ser. No. 10/015,537 entitled "A METHOD AND SYSTEM FOR DETECTING AND IDENTIFYING SCRAMBLING CODES," by Sharad Sambhwani et al., commonly owned and filed concurrently herewith, the disclosure of which is hereby incorporated by reference in their entirety as if set forth in full herein for all purposes.

The present application is also related to U.S. patent application Ser. No. 09/815,122 entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS," filed on Mar. 22, 2001, the disclosure of which is hereby incorporated by reference in their entirety as if set forth in full herein for all purposes.

BACKGROUND OF THE INVENTION

The present invention generally relates to scrambling codes. More specifically, the present invention relates to a method and system for detecting scrambling codes within a W-CDMA communication system.

Code acquisition is a fundamental algorithm required in any direct sequence spread spectrum (DSSS) receiver. Prior to de-spreading, demodulating and decoding frames, such a receiver needs to acquire knowledge of timing information relating to the underlying spreading waveform being used to spread the data-bearing signal. According to the wideband code division multiple access (W-CDMA) communication system of the 3GPP standards body, upon turning on a mobile terminal or device, a 3-step initial cell search procedure needs to be performed to acquire the primary scrambling code which is used to spread the data bearing channels. Examples of such channels are the primary common pilot channel (P-CPICH) and the dedicated physical channel (DPCH).

The first step of the 3-step initial cell search procedure relates to slot timing. In a W-CDMA communication system, each base station transmits its own scrambling code in frames over the air to a mobile terminal. Each frame is made up of fifteen (15) slots. Before the start of a frame can be located, the start of a slot needs to be identified first. Once the start of a slot is identified, then it can be assured that one of the next fifteen (15) slots represents the start of a frame. Upon conclusion of the first step, the start of a slot is identified.

The second step of the 3-step initial cell search procedure relates to frame timing. As mentioned above, at the end of the first step, the start of a slot is identified. Once that is achieved, the start of a frame can then be identified. Within a W-CDMA communication system, there are five hundred and twelve (512) base stations within the network. The base stations are identified in the network by a network matrix. The network matrix has sixty-four groups (64) and each group has eight (8) cells. A particular base station is identified by its group and its cell position within the group. During this second step, the start of a frame is identified and the mobile terminal can then synchronize to the identified frame and obtain information relating to group identification. Upon conclusion of the second step, the group which contains the base station that sent out the frame (or scrambling code) is identified, i.e., one out of sixty-four (64) group is identified.

Upon completing the first two steps of the initial cell search procedure, the receiver has knowledge of the slot and frame timing of the received scrambling code, such as a P-CPICH signal. The receiver also has knowledge of the group identification of the base station or cell being acquired. The group identification information contains information on all eight (8) primary cells within the group. Since there are eight (8) cells in a group, using the group identification information, the receiver needs only to identify one (1) out of eight (8) possible primary cells from the group.

To achieve this goal, the receiver may use one of two conventional approaches. Under the first approach, the receiver may perform a correlation of the received signals with a parallel bank of eight (8) scrambling code generators (typical correlation length N ranges from 64 to 256 chips based on frequency offset in the received signals). All the eight (8) correlations are performed within N chips, at the expense of using eight (8) parallel scrambling code generators.

Under the second approach, the receiver may sequentially correlate the received signals with eight (8) possible scrambling codes for N chips each. Using a single scrambling code generator, one may attain all eight (8) correlation results after slightly greater than 8*N chips (this number of chips is needed to allow for reassigning the scrambling code generator to another phase offset, after each correlation is performed), Implementations may not be limited to the above two conventional approaches. The above two approaches were explained for the case of real time processing of the CDMA signal, i.e. no buffering of received data was assumed for these two cases.

As mentioned above, the eight (8) scrambling codes may be generated in parallel, using eight (8) separate scrambling code generators each operating independently, or the eight (8) scrambling codes maybe generated using a single scrambling code generator using eight (8) sets of masks (a set=4 18-bit masks). However, both of these approaches require additional power consumption/silicon area. Under the first approach, additional scrambling code generators are needed; and under the second approach, additional memory storage is needed to store the received signals and it takes additional time to generate and process the necessary scrambling codes in a sequential manner.

Hence, it would be desirable to provide a method and system which is capable of generating scrambling codes for correlation to identify a received scrambling code in a more efficient manner.

SUMMARY OF THE INVENTION

An exemplary method of the present invention is used to perform scrambling code detection of eight (8) primary cells (each scrambling code being spaced sixteen (16) chips apart) in a group. According to the exemplary method, a single scrambling code generator is used to generate a master scrambling code. The master scrambling code is then used to create individual scrambling codes which are used in correlation with received signals to detect in parallel which one of the eight (8) possible primary cells in the group transmitted the received signals. The individual scrambling codes are created based on the fact that each cell's phase reference is spaced sixteen (16) chips apart.

The use of this exemplary method reduces the complexity of scrambling code or PN generator(s) in the parallel search implementation. More specifically, the use of this exemplary method avoids the need to utilize parallel logic to generate eight (8) scrambling codes. Since each primary scrambling code within a group is sixteen (16) chips apart, a buffer is used to store a sequential stream of scrambling code (i.e., the master scrambling code) output from a single scrambling code generator, and the received data is correlated in parallel with 16-chip offsets of portions of the master scrambling code. Eight dimensions are mapped to a single dimension at the expense of a slight increase in storage size.

This exemplary method can be used as part of an overall 3-step initial cell search procedure to acquire the downlink of a 3GPP WCDMA cell, which more specifically corresponds to part of the stage 3 portion of the cell search procedure.

According to an exemplary implementation of the exemplary method of the present invention, the exemplary implementation includes a single scrambling code generator and eight (8) correlators arranged in sequential order. Each of the correlators maintains a corresponding segment of the master scrambling code. For every sixteen (16) chips, a new segment of the master scrambling code is introduced into one of the correlators by the scrambling code generator, a segment of the master scrambling code is dropped from another correlator, and segments of the master scrambling code are sequentially shifted or propagated through the remaining correlators; and concurrent correlations are performed by the correlators using their respective corresponding segments of the master scrambling code and newly received signals. The foregoing process is repeated until a desired correlation length is achieved.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 7a is a diagram illustrating correlation results generated by the exemplary method shown in FIG. 3 in accordance with the present invention; and FIG. 7b is a diagram illustrating correlation results generated after one iteration by the exemplary implementation shown in FIG. 6 in accordance with the present invention.

DETAILED DESCRIPTION OF THE INVENTION

Figure 1:
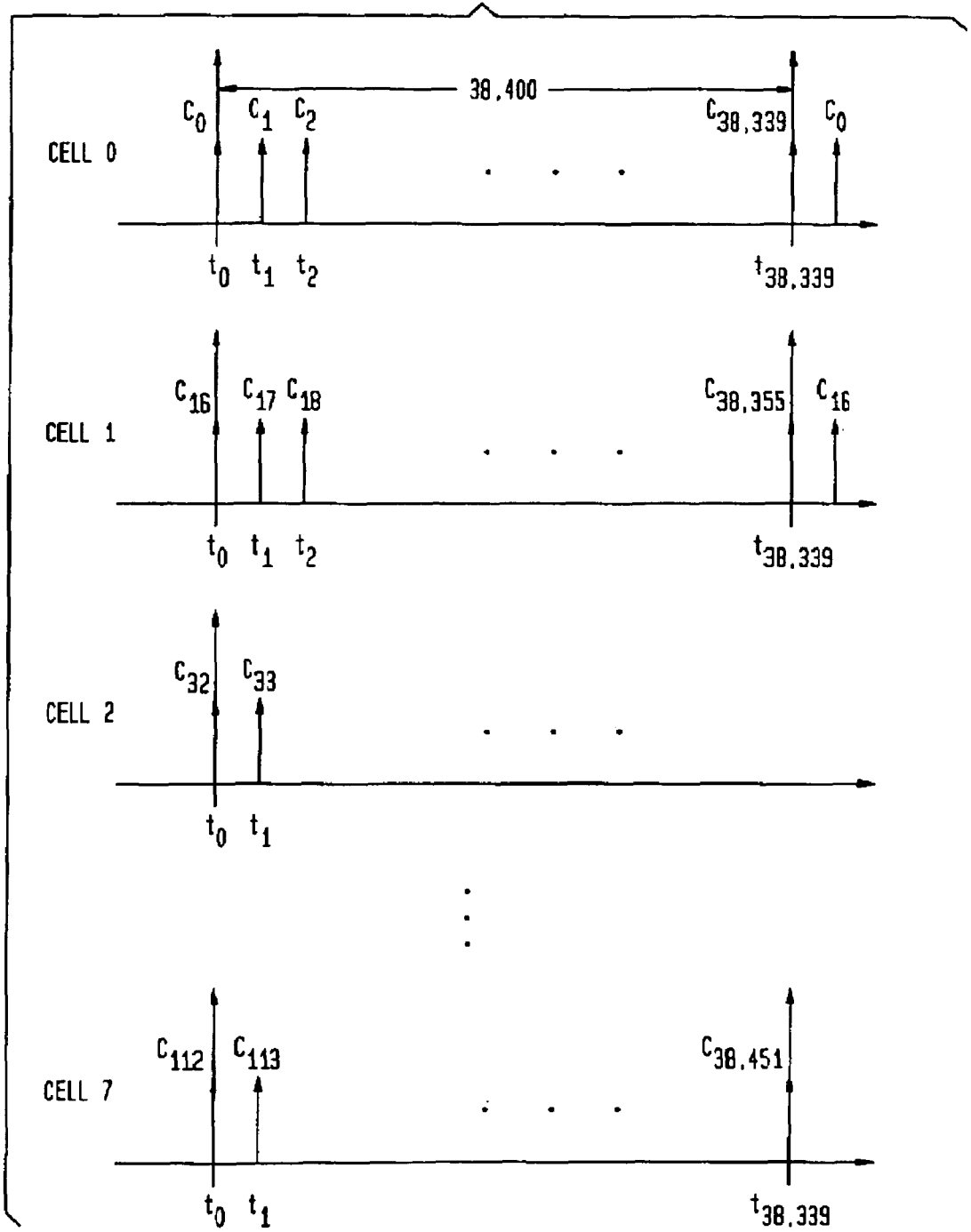
FIG. 1 is a simplified diagram illustrating the timing of the scrambling codes of the eight (8) cells within a group.

The present invention in the form of one or more exemplary embodiments will now be discussed. The present invention can be applied to the third step of the initial cell search procedure when a mobile terminal is initially powered on to identify the base station or cell which transmitted the received signals containing a scrambling code. FIG. 1 is a simplified diagram illustrating the timing of the scrambling codes of the eight (8) cells within a group. Referring to FIG. 1, the scrambling code of each cell is transmitted on a periodic basis and the period of the scrambling code of each cell is thirty-eight thousand and four hundred (38,400) chips, i.e., the scrambling code of each cell is repeated after 38,400 chips. For example, for cell "0", $C_0$ is transmitted at $t_0$ and at $t_{38,400}$. Furthermore, the scrambling codes of any two adjacent cells are offset by sixteen (16) chips. For example, cells "0" and "1" transmit $C_0$ and $C_{16}$ respectively at to. The scrambling codes of all the cells within the group are transmitted at the same frame boundary. By having a 16-chip offset between two adjacent cells, the scrambling codes between two adjacent groups of cells are offset by one hundred and twenty-eight (128) (16*8=128).

According to one exemplary method of the present invention, a scrambling code represented by the received signals is identified by using a single scrambling code generator to attain N chip correlation of the received signals with eight (8) primary scrambling codes in a group within N+16*7=N+112 chips.

Figure 2:
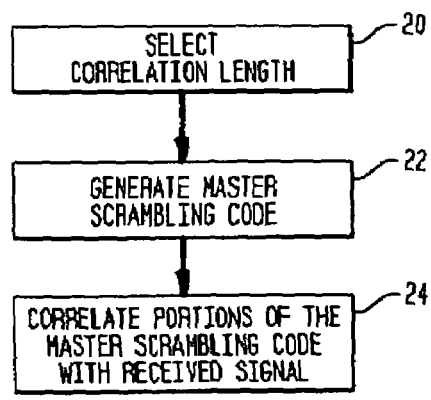
FIG. 2 is a flow diagram illustrating an exemplary method of the present invention.

FIG. 2 is a flow diagram illustrating an exemplary method of the present invention. Referring to FIG. 2, at 20, the correlation length N is first determined. The correlation length N is the amount of time during which correlation between the received signals and the generated scrambling codes is summed up. The correlation length N is selected such that reasonable correlation results can be obtained. Typical values of the correlation length N range from sixty-four (64) to two hundred and fifty-six (256), depending on the relative carrier frequency offset between the transmitted and received signals. A person of ordinary skill in the art will know how to select the proper correlation length. Next, at 22, using the selected correlation length, the chip offset (CO) between two adjacent scrambling codes, and the number of cells (C) within a group, a master scrambling code is generated. The master scrambling code has a period, e.g., 38,400 chips, which is sufficient to allow correlations to be performed reliably. N+CO*(C−1) corresponds to the amount of code needed to be generated to perform a correlation of length N with C cells spaced CO chips apart. It should be noted that the product term CO*C represents the chip offset between the respective scrambling codes of the first cells of two adjacent groups of base stations or cells. As mentioned above, during the first two steps of the initial cell search procedure, the start of the frame containing the scrambling code is identified and group identification information relating to the group which includes the cell that transmitted the received signals is available. With this information, the group which includes the cell that transmitted the received signals is identified. Moreover, using this information, the proper master scrambling code which covers all the possible scrambling codes from all the cells within the identified group can be generated. At 24, portions of the master scrambling code are used to create individual scrambling codes which correspond to the cells within the identified group. These individual scrambling codes are then correlated with the received signals in a parallel manner to determine which of the cells within the identified group transmitted the received signals.

The following is an example illustrating the exemplary method of the present invention. The example is based on the following assumptions: the correlation length N is two hundred and fifty-six (256); the chip offset CO is sixteen (16); and the number of cells C within the identified group is eight (8). The period of the master scrambling code is thirty-eight thousand and four hundred (38,400) chips.

Next, three hundred and sixty-eight (368) chips ($C_0 \rightarrow C_{367}$) of master scrambling code is generated from a single scrambling code generator tuned to the first primary cell of the underlying identified group. The length of three hundred and sixty-eight (368) chips is determined based on the formula N+CO*(C−1) which, in this case, equals to 256+16*(8−1)=256+16*7=256+112=368. It should be noted that it is not necessary to generate all three hundred and sixty-eight (368) chips prior to correlation. The generation of three hundred and sixty-eight (368) chips is specified to emphasize the total number of chips required out of the scrambling code generator to implement eight (8) parallel correlations of two hundred and fifty-six (256) chips each.

Figure 3:
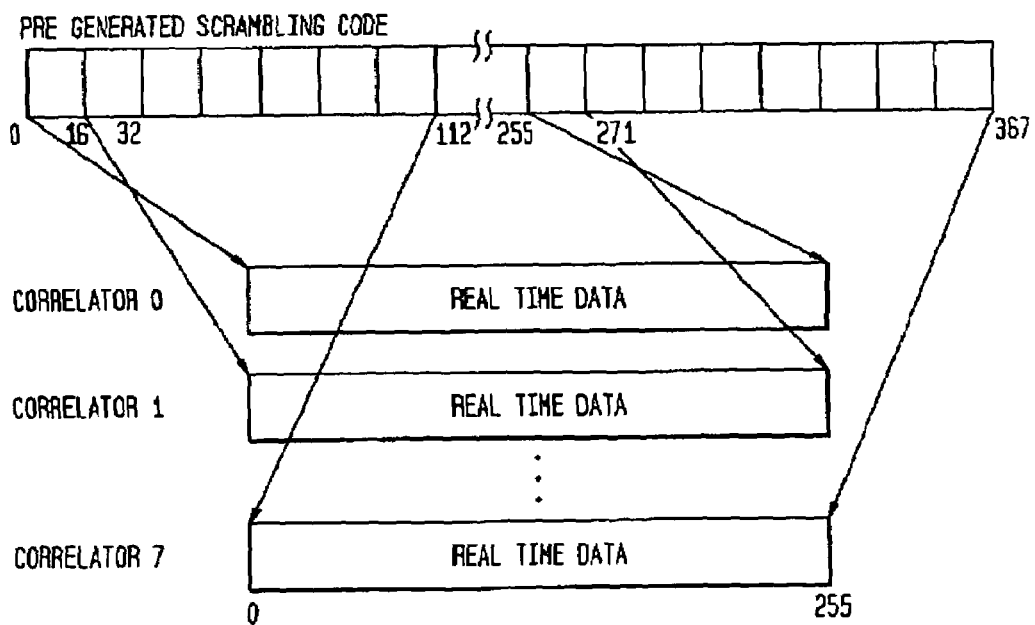
FIG. 3 is a simplified diagram illustrating parallel correlations of eight (8) cells in a group using a single scrambling code generator according to the present invention.

FIG. 3 is a simplified diagram illustrating parallel correlations of eight (8) cells in a group using a single scrambling code generator. As shown in FIG. 3, each of the eight (8) correlators correlates the received signals ($D_0 \rightarrow D_{255}$) with two hundred and fifty-six (256) chips of scrambling code, each starting at an offset of sixteen (16) chips. For example, the first correlator correlates the received signals ($D_0 \rightarrow D_{255}$) with the complex conjugate of ($C_0 \rightarrow C_{255}$); the second correlator correlates the received signals ($D_0 \rightarrow D_{255}$) with the complex conjugate of ($C_{16} \rightarrow C_{271}$); and so on, and the final correlator correlates the received signals ($D_0 \rightarrow D_{255}$) with the complex conjugate of ($C_{112} \rightarrow C_{367}$). The correlation results are then obtained from each of the correlators. By evaluating the correlation results, the scrambling code represented by the received signals can be identified and, hence, the identity of the base station or cell which transmitted the received signals can also be determined.

Figure 4:
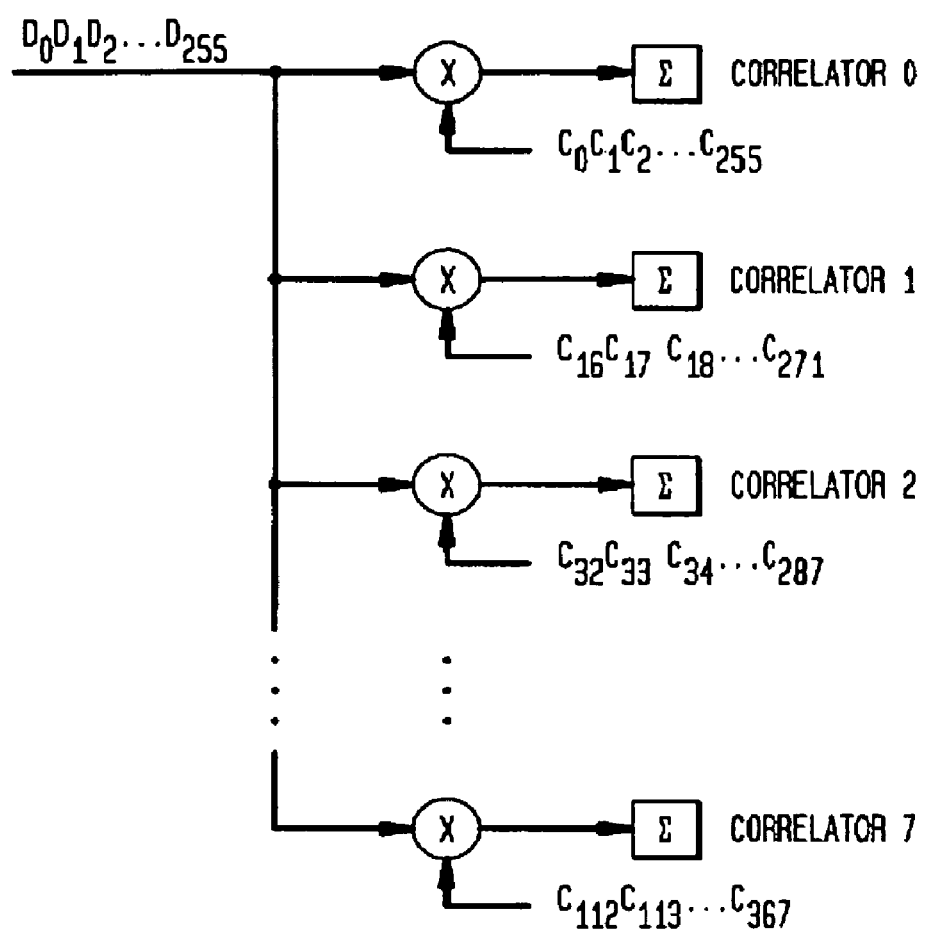
FIG. 4 is a simplified diagram illustrating one exemplary implementation of the exemplary method according to the present invention.

FIG. 4 is a simplified diagram illustrating an exemplary implementation of the exemplary method described above in accordance with the present invention. It is to be noted that the received signals are processed simultaneously in real-time by eight (8) parallel correlators. The scrambling code generator generates three hundred and sixty-eight (368), i.e., N+112 chips. This is in contrast to 8N chips that must be generated for the alternative approach in the parallel search implementation. Hence, there is a factor of 8N/(N+128) savings on the scrambling code generation complexity using the present invention, which equals to 5.3 for N=256 (an 82% reduction in complexity).

The exemplary method of the present invention as described may be implemented in software, hardware or a combination of both. For example, the exemplary method of the present invention may be implemented as control logic using software embedded in a mobile terminal. When implemented using software, the exemplary method may be implemented in a modular or integrated manner within the mobile terminal. Based on disclosure provided herein, a person of ordinary skill in the art will know of other ways and/or methods to implement the present invention.

Referring to FIG. 3, it can be seen that in accordance with the exemplary method, for a correlation length of two hundred and fifty-six (256), a 16-chip offset between scrambling codes and eight (8) cells within a group, a master scrambling code with a period of thirty-eight thousand and four hundred (38,400) chips is generated. This would require a global storage access of 8N*2 locations (since data is complex) for every N chips of correlation. If hardware resources are not limited, then the master scrambling code and the received signals can be stored in memory registers and each correlator can then read out the corresponding 256-chip scrambling code that it needs to perform the correlation.

Figure 5:
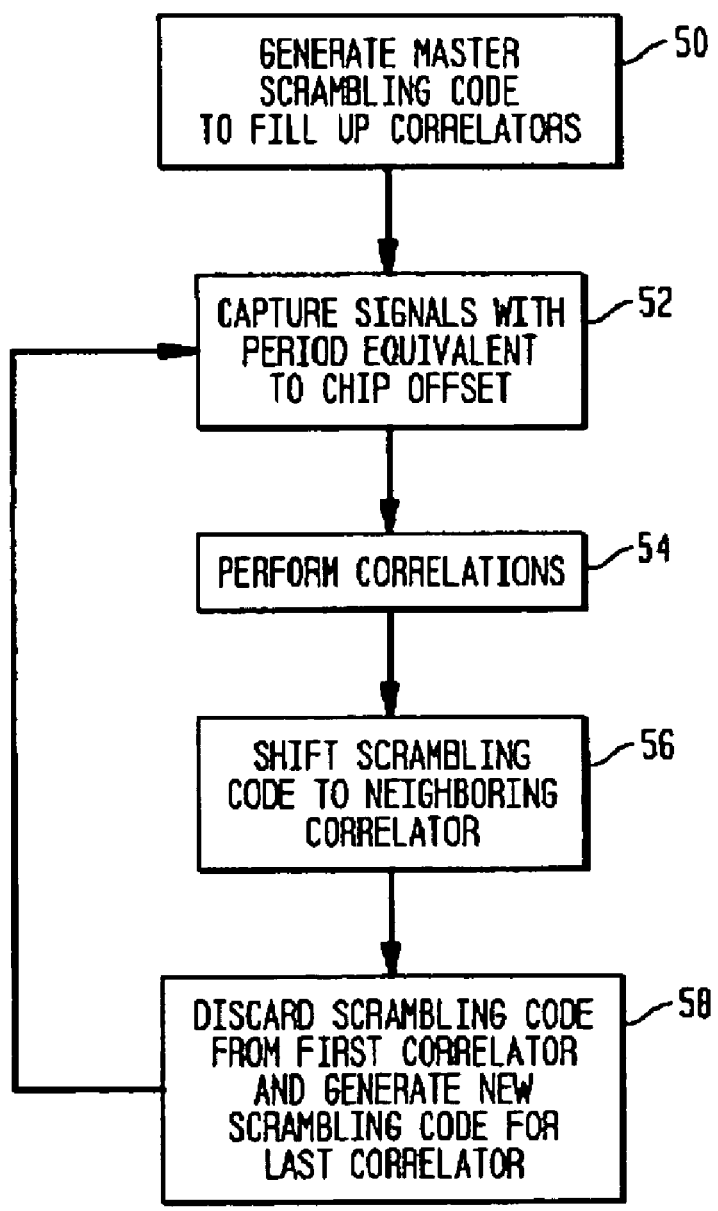
FIG. 5 is a flow diagram illustrating one exemplary implementation of the exemplary method in accordance with the present invention.

FIG. 5 is a flow diagram illustrating an exemplary implementation of the exemplary method described above in accordance with the present invention. As will be illustrated below, the exemplary implementation reduces the storage and access requirements needed to implement the exemplary method in accordance with the present invention. Referring to FIG. 5, at 50, a portion of the master scrambling code is generated to populate the correlators. The generation of the master scrambling code by a single scrambling code generator is described above. The number of correlators and the length of each correlator respectively depend on the number of cells within a group and the chip offset between the respective scrambling codes of two adjacent cells within the group. The correlators collectively contain the entire generated portion of the master scrambling code, i.e., each correlator is populated with a segment of the generated portion of the master scrambling code. The length of the portion of the master scrambling code to be generated depends on the chip offset between the respective scrambling codes of two adjacent groups of cells. As mentioned above, this chip offset, in turn, depends on the number of cells within a group and the chip offset between the respective scrambling codes of two adjacent cells within the group. For instance, for a W-CDMA communication system, there are eight (8) cells in a group and the chip offset between the scrambling codes of two adjacent cells within the group is sixteen (16). Hence, the length of the portion of the master scrambling code to be initially generated is one hundred and twenty-eight (128=16*8) chips.

At 52, a set of received signals are captured. The duration of the capture period equals to the chip offset between the respective scrambling codes of two adjacent cells within a group. For a W-CDMA communication system, the duration of the capture period is thus sixteen (16) chips.

At 54, the set of received signals are correlated with the generated portion of the master scrambling code by the correlators and the correlation results are stored. After the correlations are performed, at 56, each correlator shifts or propagates its segment of the generated portion of the master scrambling code to its neighboring correlator, with the exception that, at 58, the first correlator discards its current segment and the last correlator receives a newly generated segment from the single scrambling code generator. Then, the process returns to 52 where the next set of received signals are captured and correlated. The foregoing process is repeated until the entire master scrambling code is generated and correlated. From an alternative perspective, this can be viewed as segments of the master scrambling code being correlated in a pipelined fashion on a first-in-first-out basis.

Figure 6:
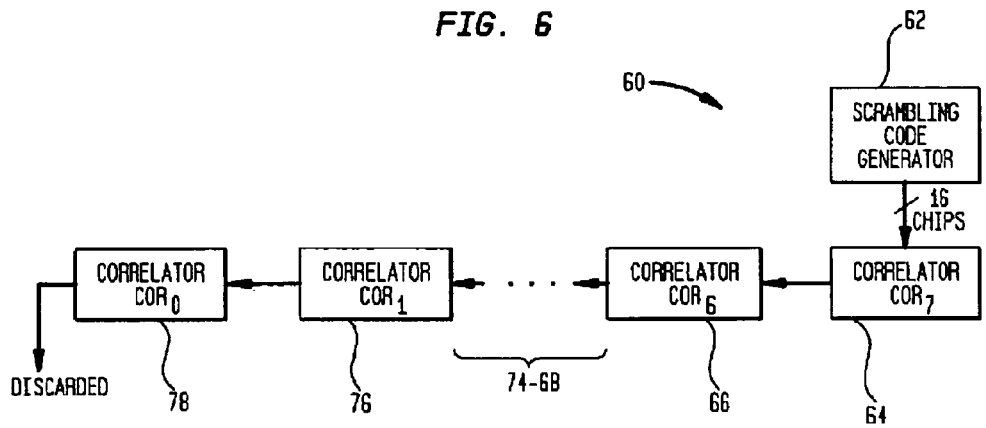
FIG. 6 is a simplified diagram illustrating a second exemplary implementation of the exemplary method in accordance with the present invention.

FIG. 6 is an exemplary physical implementation of the exemplary method described above. Referring to FIG. 6, there is shown an exemplary system 60 having a single scrambling code generator 62 and eight (8) correlators 64–78. This exemplary system 60 operates based on the following assumptions: there are eight (8) cells in a group; the chip offset between the respective scrambling codes of two adjacent cells in a group is sixteen (16) chips; and the correlation length N is selected to be two hundred and fifty-six (256).

The exemplary system 60 operates as follows. Initially, before any correlation is performed, the correlators $COR_0$–$COR_7$ 64–78 are collectively populated with a portion of the master scrambling code by the single scrambling code generator 62. The portion of the master scrambling code that is initially generated is one hundred and twenty-eight (128=16*8) in length ($C_0$→$C_{127}$). This portion of the master scrambling code is segmented and populated into the correlators $COR_0$–$COR_7$ 64–78. Each correlator has a length of sixteen (16). For example, after initial population, correlator $COR_0$ 78 includes scrambling code segment $C_0$–$C_{15}$; correlator $COR_1$ 76 includes segment $C_{16}$–$C_{31}$; and correlator $COR_7$ 64 includes segment $C_{112}$–$C_{127}$; and so on. It should be noted that the initial generation of all one hundred and twenty-eight (128) chips of the portion of the master scrambling code before starting any of the correlations is not required. One of the correlators 64–78 can be started every sixteen (16) chips in a pipelined fashion.

Next, a set of complex data signals or samples which is sixteen (16) chips in length, $D_0$–$D_{15}$, are received and fed to each of the correlators 64–78. Then, each correlator partially correlates the same set of received complex data samples with the complex conjugate of its corresponding scrambling code segment. It is to be noted that the respective scrambling code segments of any two adjacent correlators have a chip offset of sixteen (16) chips. For example, the first correlator $COR_0$ 78 correlates the received data samples, $D_0$–$D_{15}$, with the complex conjugate of its corresponding scrambling code segment, $C_0$–$C_{15}$; the second correlator $COR_1$ 76 correlates the received data samples, $D_0$–$D_{15}$, with the complex conjugate of its corresponding scrambling code segment, $C_{16}$–$C_{31}$; and so on, and the final correlator $COR_7$ 64 correlates the received data samples, $D_0$–$D_{15}$, with the complex conjugate of its corresponding scrambling code segment, $C_{112}$–$C_{127}$. The correlations of the eight (8) correlators 64–78 are performed concurrently in a parallel manner and the correlation results are stored for subsequent evaluation.

After this first iteration of correlations, each correlator passes its current corresponding scrambling code segment to a neighboring correlator. It should be noted that each correlator has two neighboring correlators. In effect, with two exceptions which will be described below, this means each correlator also receives a new corresponding scramble code segment from another neighboring correlator. Graphically, this is shown as follows: $COR_1$→$COR_0$, $COR_2$→$COR_1$, $COR_3$→$COR_2$, $COR_4$→$COR_3$, $COR_5$→$COR_4$, $COR_6$→$COR_5$. In essence, the scrambling code segments are shifted or propagated along the correlators 64–78. The two exceptions are the first correlator $COR_0$ 78 and the last correlator $COR_7$ 64. For the first correlator $COR_0$ 78, its current corresponding scramble code segment is discarded; and for the last correlator $COR_7$ 64, a new scrambling code segment generated by the single scrambling code generator 62 is fed to the last correlator $COR_7$ 64. The newly generated scrambling code segment is the next segment of the master scrambling code that follows the scrambling code segment that was in the last correlator $COR_7$ 64 before that scrambling code segment was transferred to correlator $COR_6$ 66. For example, after the first iteration, the newly generated scrambling code segment to be fed into the last correlator $COR_7$ 64 is $C_{128}$–$C_{143}$. This is because scrambling code segment $C_{128}$–$C_{143}$ follows scrambling code segment $C_{112}$–$C_{127}$ within the master scrambling code. By shifting or transferring the scrambling code segments as described above, the entire master scrambling code is propagated along all the correlators 64–78 and is eventually correlated with the received data samples as described in FIG. 3.

The next set of complex data samples are received, $D_{16}$–$D_{31}$, and loaded into the correlators 64–78. Another iteration of concurrent correlations by the correlators 64–78 is then performed again. The foregoing process of shifting the scrambling code segments, receiving the next set of complex data samples and performing another iteration of correlations is repeated until the master scrambling code is correlated or, conversely, the collective length of all the received complex data samples reaches the correlation length.

FIG. 7a illustrates the correlation results generated using the exemplary method shown in FIG. 3. FIG. 7b illustrates the correlation results after the first iteration of correlations by the exemplary system 60. Comparing FIGS. 7a and 7b, it can be seen that by using the exemplary system 60 shown in FIG. 6, sixteen (16) terms are generated by each of the eight (8) correlations after one iteration. Hence, in order to generate the complete results as shown in FIG. 7a based on a correlation length of two hundred and fifty-six (256), sixteen (16) total iterations are executed.

As can be seen above, scrambling code segments which make up the master scrambling code are internally shared amongst correlators 64–78. For every predetermined period (that is defined by the chip offset between the respective scrambling codes of any two adjacent cells within a group), e.g., sixteen (16) chips, the corresponding scrambling code segment of each correlator is refreshed or updated. This sharing of scrambling code segment reduces the access to the otherwise globally stored master scrambling code by a factor of eight (8) (for cases using the above assumptions), i.e., 2N scrambling code read accesses are required every N chips of correlations.

In addition, for every iteration of correlations, the scrambling code generator 62 transfers or generates only 2N/16 binary values to one of the correlators 64–78. As mentioned above, the rest of the correlators 66–78 internally share the scrambling code segments which are already present amongst the correlators 64–78.

To further reduce scrambling code memory access as well as each correlator's working size, the technique of packing and unpacking bits may be used. If the above binary values were packed into a word and then unpacked at the time of correlation, the scrambling code generator 62 then needs to transfer only 2N/(16*16) 16-bit words to the group of correlators 64–78. That is, the working size of each correlator may be reduced to 2N/(16*16) by packing sixteen (16) bits at a time. This also reduces scrambling code storage access to 2N/16.

Furthermore, it is understood that while the present invention as described above is applicable to a W-CDMA communication system, it should be clear to a person of ordinary skill in the art that the present invention can be applied to other types of communication systems.

Moreover, it should be noted that the present invention as described herein may be implemented in a number of ways. For example, the present invention may be implemented using the adaptive computing architecture as disclosed in U.S. patent application Ser. No. 09/815,122 entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS," filed on Mar. 22, 2001, the disclosure of which is hereby incorporated by reference in their entirety as if set forth in full herein for all purposes. For instance, using the adaptive computing architecture, the scrambling code generator 62 and the correlators 64–78 may be implemented on demand within a mobile terminal. Based on the disclosure provided herein, a person of ordinary skill in the art will know of other ways and/or methods to implement and apply the present invention.

It is further understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for identifying a scrambling code from signals received from a base station, comprising:
    a scrambling code generator configured to generate a plurality of scrambling code segments in a sequential manner, the plurality of scrambling code segments making up a master scrambling code; and
    a plurality of correlators arranged in a sequential manner, each correlator maintaining a corresponding scrambling code segment and configured to correlate a set of received signals with its corresponding scrambling code segment and generate corresponding correlation results, the plurality of correlators collectively performing their correlations in a parallel manner in one or more iterations;
    wherein after each performed iteration, all but one of the plurality of correlators shift their corresponding scrambling code segments to their respective neighboring correlators and a new scrambling code segment is generated by the scrambling code generator and fed to one of the plurality of correlators,
    wherein a mobile terminal incorporates the system.

2. The system according to claim 1 wherein the number of iterations performed by the plurality of correlators depends on a selected correlation length and a predetermined chip offset; and
    wherein the length of each correlator depends on the predetermined chip offset.

3. The system according to claim 1 wherein after each performed iteration, a new set of received signals is received by each correlator.

4. The system according to claim 1 wherein the correlation results generated by the plurality of correlators are evaluated to identify the scrambling code from the received signals thereby allowing the identity of the base station which transmitted the received signals to be identified.

5. The system according to claim 1 wherein the plurality of correlators perform their correlations in a real-time manner.

6. The system according to claim 1 wherein the base station is located in a W-CDMA communication network.

7. A system for identifying a scrambling code from signals received from a base station, the base station belonging to one of a plurality of base station groups in a communication network, the system comprising:
    a scrambling code generator configured to generate a plurality of scrambling code segments in a sequential manner, the plurality of scrambling code segments making up a master scrambling code; and
    a plurality of correlators arranged in a sequential manner, each correlator maintaining a corresponding scrambling code segment and configured to correlate a set of received signals with its corresponding scrambling code segment and generate corresponding correlation results, the plurality of correlators collectively performing their correlations in a parallel manner in one or more iterations;
    wherein after each performed iteration, all but one of the plurality of correlators shift their corresponding scrambling code segments to their respective neighboring correlators and a new scrambling code segment is generated by the scrambling code generator and fed to one of the plurality of correlators,
    wherein a mobile terminal incorporates the system.

8. The system according to claim 7 wherein the number of iterations performed by the plurality of correlators depends on a selected correlation length and a predetermined chip offset; and
    wherein the length of each correlator depends on the predetermined chip offset.

9. The system according to claim 7 wherein after each performed iteration, a new set of received signals is received by each correlator.

10. The system according to claim 7 wherein the correlation results generated by the plurality of correlators are evaluated to identify the scrambling code from the received signals thereby allowing the identity of the base station which transmitted the received signals to be identified.

11. The system according to claim 7 wherein the master scrambling code has a period determined by a selected correlation length and a predetermined group chip offset.

12. The system according to claim 11 wherein the predetermined group chip offset is determined by the number of base stations within a base station group and a predetermined chip offset.

13. The system according to claim 7 wherein the number of the plurality of correlators depends on the number of base stations within a base station group.

14. The system according to claim 7 wherein the plurality of correlators perform their correlations in a real-time manner.

15. The system according to claim 7 wherein the communication network is a W-CDMA communication network.

16. A system for identifying a scrambling code from signals received from a base station, the base station belonging to one of a plurality of base station groups in a communication network, the system comprising:
    a scrambling code generator configured to generate a plurality of scrambling code segments in a sequential manner, the plurality of scrambling code segments making up a master scrambling code; and
    a plurality of correlators coupled in a sequential manner and having a first correlator, a last correlator and a plurality of intermediate correlators coupled between the first correlator and the last correlator, the plurality of correlators configured to perform correlations in a parallel manner in one or more iterations;
    wherein:
    the plurality of correlators are each populated with corresponding scrambling code segments generated by the scrambling code generator;
    each of the plurality of correlators receives a set of received data samples;
    the plurality of correlators correlate the set of received data samples with their corresponding scrambling code segments in parallel in one iteration;
    after the one iteration is completed, the plurality of intermediate correlators and the last correlator shift their corresponding scrambling code segments to their respective neighboring correlator, the corresponding scrambling code segment of the first correlator is discarded, and a new scrambling code segment is generated by the scrambling code generator and fed to the last correlator.

17. The system according to claim 16 wherein after the one iteration is completed, a new set of received data samples is received by the plurality of correlators.

18. The system according to claim 16 wherein the master scrambling code has a period determined by a selected correlation length and a predetermined group chip offset.

19. The system according to claim 18 wherein the predetermined group chip offset is determined by the number of base stations within a base station group and a predetermined chip offset.

20. The system according to claim 16 wherein the number of the plurality of correlators depends on the number of base stations within a base station group.

21. The system according to claim 16 wherein the plurality of correlators perform their correlations in a real-time manner.

22. The system according to claim 16 wherein the new scrambling code segment follows the corresponding scrambling code segment which was in the last correlator before that corresponding scrambling code segment was shifted.

23. A mobile terminal incorporating the system as recited in claim 16.

24. The system according to claim 16 wherein the communication network is a W-CDMA communication network and the system is used in connection with acquisition of a downlink of a 3GPP W-CDMA cell during stage 3 of a cell search procedure.

25. A method for identifying a scrambling code from signals received from a base station, comprising:
selecting a correlation length;
identifying a master scrambling code using the selected correlation length, the master scrambling code comprising a plurality of scrambling code segments arranged in a sequential manner;
populating each of a plurality of correlators with a corresponding scrambling code segment in a sequential manner;
providing a set of received data samples to each of the plurality of correlators;
causing each of the plurality of correlators to correlate the set of received data samples with its corresponding scrambling code segment and store corresponding correlation results;
shifting the corresponding scrambling code segments of all but one of the plurality of correlators to their respective neighboring correlators;
populating one of the plurality of correlators with a new scrambling code segment, the new scrambling code segment sequentially following the corresponding scrambling code segments which have previously been used to populate the plurality of correlators; and
repeating the providing step, the causing step, the shifting step and the populating step with the new scrambling code segment with successive sets of received data samples until the selected correlation length is achieved.

26. The method of claim 25 further comprising:
evaluating the stored correlation results generated by the plurality of correlators to identify the scrambling code from the signals received from the base station thereby allowing the identity of the base station to be identified.

27. The method of claim 25 wherein the causing step further comprises:
causing each of the plurality of correlators to correlate in a concurrent and real-time manner.

28. A mobile terminal utilizing the method as recited in claim 25.

29. The method according to claim 25 wherein the base station is located in a W-CDMA communication network and the method is used in connection with acquisition of a downlink of a 3GPP W-CDMA cell during stage 3 of a cell search procedure.

30. A method for identifying a scrambling code from signals received from a base station, the base station belonging to one of a plurality of base station groups in a communication network, the method comprising:
identifying a master scrambling code, the master scrambling code comprising a plurality of scrambling code segments arranged in a sequential manner;
performing a series of successive correlation iterations using a number of scrambling code segments taken from the plurality of scrambling code segments and corresponding sets of received data samples; and
for each correlation iteration:
providing a new set of received data samples;
correlating the new set of received data samples with the number of scrambling code segments and storing correlation results; and
refreshing the number of scrambling code segments in a first-in-first-out 31. The method of claim 30 further comprising:
evaluating the collectively stored correlation results to identify the scrambling code from the signals received from the base station thereby allowing the identity of the base station to be identified.

32. The method of claim 30 wherein for each correlation iteration, the correlating step further comprises:
correlating the new set of received data samples with each of the number of scrambling code segments in a concurrent manner.

33. The method of claim 30 further comprising:
selecting a correlation length; and
wherein the period of the master scrambling code depends on the correlation length and a predetermined group chip offset.

34. The method of claim 33 wherein the predetermined group chip offset depends on the number of base stations within a base station group and a predetermined chip offset between two adjacent base stations within the base station group.

35. The method of claim 33 wherein the number of successive correlation iterations depends on the selected correlation length and the number of scrambling code segments being correlated during each correlation iteration.

36. A mobile terminal utilizing the method as recited in claim 30.

37. The method according to claim 30 wherein the communication network is a W-CDMA communication network and the method is used in connection with acquisition of a downlink of a 3GPP W-CDMA cell during stage 3 of a cell search procedure.

38. A method for identifying a scrambling code from signals received from a base station, the base station belonging to one of a plurality of base station groups in a communication network, the method comprising:
identifying a master scrambling code, the master scrambling code comprising a plurality of scrambling code segments arranged in a sequential manner;

configuring a scrambling code generator to generate the plurality of scrambling code segments one scrambling code segment at a time;

configuring a plurality of correlators in a sequential manner to perform correlations, the plurality of correlators having a first correlator, a last correlator and a plurality of intermediate correlators coupled between the first correlator and the last correlator;

populating each of the plurality of correlators with a corresponding scrambling code segment generated from the scrambling code generator;

causing the plurality of correlators to perform a series of successive correlation iterations using their corresponding scrambling code segments and corresponding sets of received data samples; and for each correlation iteration:
providing a new set of received data samples;
causing the plurality of correlators to respectively correlate the new set of received data samples with their corresponding scrambling code segments and store respective correlation results;
shifting the corresponding scrambling code segments of the plurality of intermediate correlators and the last correlator to their respective neighboring correlators;
transferring a new scrambling code segment generated by the scrambling code generator to the last correlator, the new scrambling code segment is in sequence with the corresponding scrambling code segment which was previously present in the last correlator.

39. The method of claim 38 further comprising:
for each correlation iteration, discarding the corresponding scrambling code segment of the first correlator.

40. The method of claim 38 wherein the causing step further comprises:
causing the plurality of correlators to correlate in a concurrent manner.

41. The method of claim 38 further comprising:
selecting a correlation length; and
wherein the period of the master scrambling code depends on the correlation length and a predetermined group chip offset.

42. The method of claim 41 wherein the predetermined group chip offset depends on the number of base stations within a base station group and a predetermined chip offset between two adjacent base stations within the base station group.

43. The method of claim 41 wherein the number of successive correlation iterations depends on the selected correlation length and the length of each scrambling code segment.

44. A mobile terminal utilizing the method as recited in claim 38.

45. The method according to claim 38 wherein the communication network is a W-CDMA communication network and the method is used in connection with acquisition of a downlink of a 3GPP W-CDMA cell during stage 3 of a cell search procedure.

* * * * *